(12) United States Patent
Mihara

(10) Patent No.: US 6,314,242 B1
(45) Date of Patent: Nov. 6, 2001

(54) SINGLE-LENS REFLEX VIEW FINDER

(75) Inventor: Shinichi Mihara, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/408,187

(22) Filed: Sep. 29, 1999

(30) Foreign Application Priority Data

Sep. 29, 1998 (JP) .................................................. 10-290100

(51) Int. Cl.$^7$ .................................................. G03B 13/24
(52) U.S. Cl. .......................... 396/150; 396/384; 396/382
(58) Field of Search .................................. 396/148, 150, 396/151, 152, 354, 384, 386, 385, 382; 348/341

(56) References Cited

U.S. PATENT DOCUMENTS

| | | | |
|---|---|---|---|
| 2,881,686 | * | 4/1959 | Ruhle .................................... 396/150 |
| 3,498,198 | * | 3/1970 | Fujii .................................... 396/354 X |
| 4,027,327 | * | 5/1977 | Harada .................................... 396/152 |
| 4,119,982 | * | 10/1978 | Imura et al. ........................... 396/354 |
| 4,381,521 | * | 4/1983 | Iida et al. ............................ 396/148 X |
| 6,018,416 | * | 1/2000 | Mihara ............................... 396/386 X |

FOREIGN PATENT DOCUMENTS 53-125832   11/1978   (JP) .

* cited by examiner

Primary Examiner—W. B. Perkey
(74) Attorney, Agent, or Firm—Pillsbury Winthrop LLP

(57) ABSTRACT

A single-lens reflex view finder wherein a partial amount of a light bundle transmitting through an imaging optical system which picks up an image of an object is split by optical path splitting means, one of split optical paths is used as a view finder optical path end focus confirming means is disposed only on a central portion of a refracting surface which is disposed at a location of an optional image formed in the view finder optical path.

19 Claims, 10 Drawing Sheets

FIG. 11A    FIG. 11B
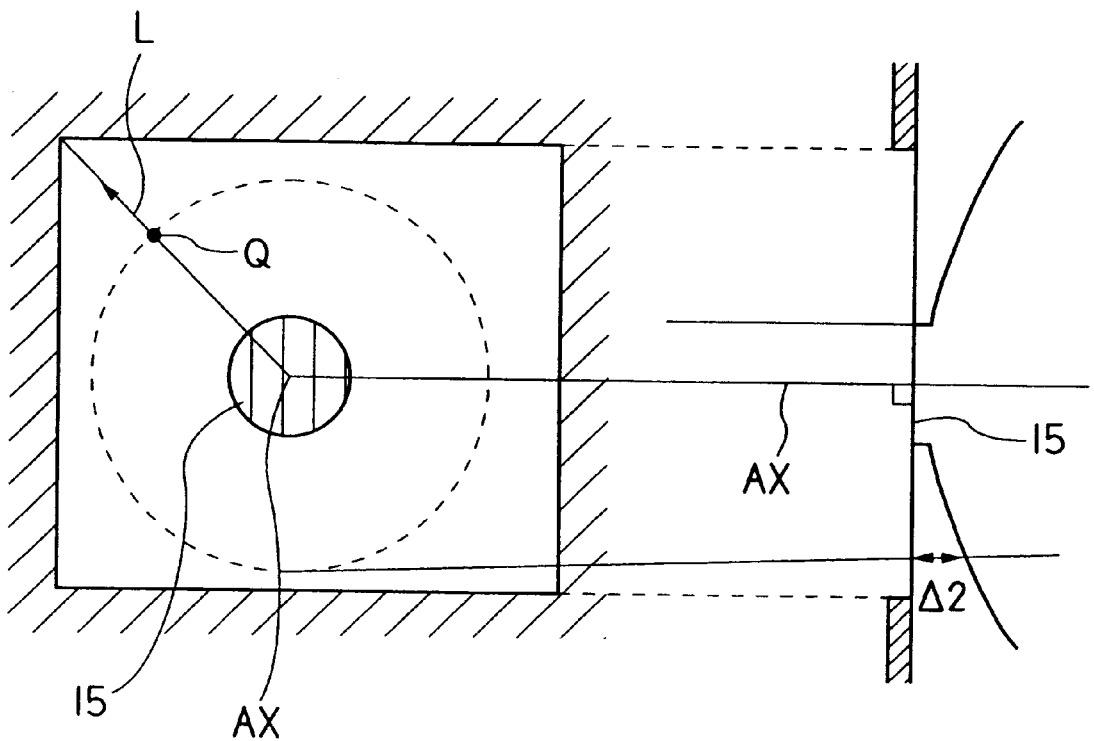
FIG. 12A    FIG. 12B
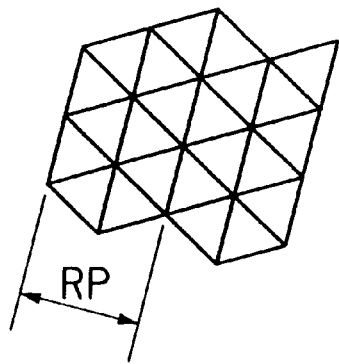
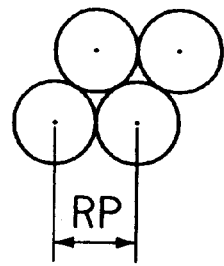

SINGLE-LENS REFLEX VIEW FINDER

BACKGROUND OF THE INVENTION a) Field of the Invention

The present invention relates to a single-lens reflex view finder which uses an electronic image pickup device such as a CCD, and more specifically a TTL view finder characterized in its focus confirming means.

b) Description of the Prior Art

A digital camera (electronic camera) has recently been attracting attention as a camera of the next generation which is to replace a silver salt 35 mm film camera (generally referred to as a Leica size camera). The digital camera has also been configured as a single-lens reflex type.

A single-lens reflex camera requires a surface having a refractive power such as a condenser lens which is disposed in the vicinity of an imaging point of a view finder system and has a function to relay a pupil, planar surface on which a fine structure such as microprisms or a mat is formed at the imaging point to permit confirming focus at the imaging point, and an optical element which is disposed on a side opposite to the fine structure and composed of a surface of a Fresnel structure having refracting function.

A CCD or the like which is used as an image pickup device in case of the digital camera has a size which is on the order of several to dozen of percent in a diagonal length of the silver salt 35 mm film. Therefore, it is necessary for the digital camera to enhance on a view finder screen, and when a Fresnel surface is to be used in the digital camera, a pitch of rings must be narrow since it is required to make the rings unnoticeable. Accordingly, the digital camera poses a problem that it makes the Fresnel hardly workable and allows it to produce an influence due to diffraction. Though the surface of the condenser lens may be configured as an ordinary refracting surface, the ordinary surface has a power weaker than that of the Fresnel surface, whereby another surface of the condenser lens must be configured as a curved surface having a refractive power. In such a case, however, the condenser lens has no focus confirming function and the curved surface must be transparent.

Furthermore, the fine structure of the microprisms or the mat surface is apt to be defective and can be worked extremely hardly.

SUMMARY OF THE INVENTION

A primary object of the present invention is to provide a single-lens reflex view finder which is free from degradation of viewing performance such as eclipse of rays even when a magnification is enhanced on a view finder screen.

Another object of the present invention is to provide a single-lens reflex view finder which makes a defect of a fine structure used as focus confirming means to be hardly noticeable.

The single-lens reflex view finder according to the present invention comprises optical path splitting means which splits at least a partial amount of a light bundle transmitting through an imaging optical system which picks up an image of an object as a view finder optical system for observing the object, a refracting surface which is disposed at an optional imaging location in the view finder optical path split by the optical path splitting means and focus confirming means which is disposed only on a central portion of the refracting surface.

BRIEF DESCRIPTION OF THE DRAWINGS

FIGS. 11A and 11B are diagrams descriptive of a deviation amount of a surface on which the focus confirming means is disposed;

FIGS. 12A and 12B are diagrams showing another example of focus confirming means;

DETAILED DESCRIPTION OF THE PREFERRED EMBODIMENTS

Figure 1:
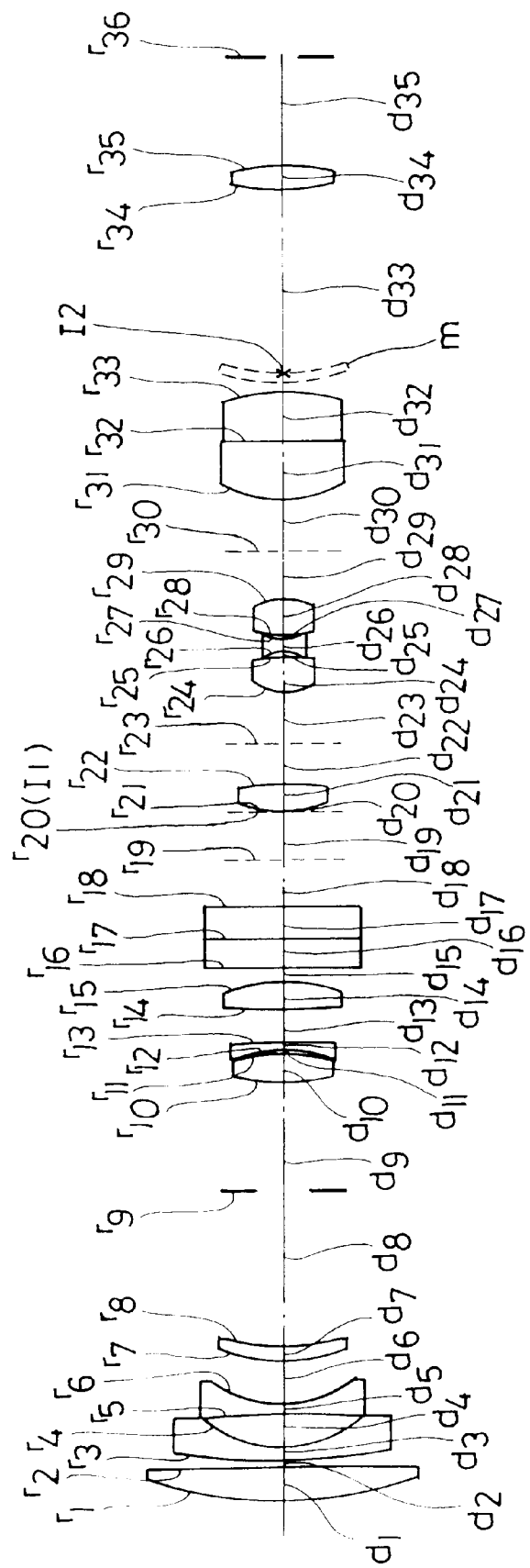
FIG. 1 is a sectional view illustrating a composition of a first embodiment of the view finder according to the present invention.

The single-lens reflex view finder according to the present invention which has a first composition is characterized in that it comprises a surface which has a curved surface on a circumferential portion and a planar surface on a central portion nearly perpendicular to an optical axis which is located at a primary imaging location in a view finder optical path which is split from a photographing optical path by optical path splitting means such as a light splitting prism after a light bundle has passed through an imaging optical system for picking up an image of an object, and that a fine relief structure of polygonal pyramids or cones, a pair of wedge-shaped prisms or the so-called mat surface having a light scattering function is disposed as focus confirming means on the central planar surface.

In the view finder which has the composition described above, the curved surface out of the surfaces disposed at the primary imaging point is configured to be transparent, have a function to relay a pupil and not to eclipse a marginal portion of a visual field. Furthermore, the central surface at the central portion is configured as the fine structure of the polygonal pyramids or the cones, the pair of wedge-shaped prisms or the so-called mat surface having the light scattering function (hereinafter referred to simply as focus confirming means) so that focus can be confirmed only on the planar surface. The central portion has no function of a condenser since it is the planar surface, but it does not eclipse rays since it is located at a center of a visual field. The focus confirming means may be disposed not at the primary imaging location but at another imaging location or on any surface so far as an imaging location is disposed on the surface.

A single-lens reflex view finder forms an image which is remarkably small and such an optical system exhibits excellent optical performance when it is configured as a secondary imaging type. When the optical system is configured to have a secondary imaging magnification which is not lower than 1×, the optical system forms a secondary image having a large size and when the focus confirming means is disposed at a location of this secondary image, a magnification is not so high at subsequent stage, thereby enabling to make dust or injuries not so noticeable on a screen.

The view finder according to the present invention which has a second composition is characterized in that a reimaging optical system is disposed after a primary imaging location formed in an optical path on a side of the view finder (view finder optical path) out of the optical paths split by optical path splitting means, that the reimaging optical system is configured to have a magnification not lower than ×1, a surface which consists of a curved surface having a refractive power and a central planar surface nearly perpendicular to the optical axis like that used in the view finder having the first composition is disposed at an imaging location of the reimaging optical system which is a secondary imaging location and that focus confirming means is disposed only on the central planar surface.

A quality of a secondary image is generally lower than that of a primary image at a marginal portion of a visual field. Since focus confirmation is rather difficult at a low image quality, the focus confirming means is ordinarily disposed at the primary imaging location.

However, a merit can be obtained also by disposing the focus confirming means at the secondary imaging location as described above, and when a primary image is remarkably small, it is rather possible to prevent an image from being eclipsed and obtain an optical system having viewing performance not problematic even at a marginal portion of a visual field by disposing the focus confirming means only on the central portion of the secondary imaging location where image quality is high, configuring the circumferential surface where an image quality is low as a transparent surface having a refractive power and correcting the image quality at an eyepiece disposed at a subsequent stage.

Furthermore, a surface on which the focus confirming means is disposed must be sealed tightly from surroundings thereof since dust and injuries on this surface are apt to be noticeable. Dust is apt to adhere to the surface on which the focus confirming means is disposed when an adjacent surface on an air side is movable in particular. In such a case, it is desirable to dispose a sealing member such as a cover glass plate or a cover made of a transparent plastic material between the surface on which the focus confirming means in disposed and the movable surface.

In an ordinary single-lens reflex view finder, a circumferential surface around a visual field on a focus confirming surface is composed of a light scattering mat. When the focus confirming means is disposed also on a marginal surface of a secondary imaging surface, it is therefore preferable to configure the marginal surface not as a surface having a refractive power or a planar surface nearly perpendicular to an optical axis, but as a curved surface which has a shape along curvature of field of a secondary image. The curvature of field is determined nearly by a Petzval's sum of a view finder system.

Though the curvature of field is determined nearly by the Petzval's sum of the view finder system, a sagittal image surface and a meridional image surface may deviate at a larger range in the same direction as the curvature of field calculated from the Petzval's sum. Therefore, it is more preferable to determine a shape of the mat surface over an entire range of which the mat surface is to be disposed dependently on locations of the sagittal image surface and the meridional image surface.

When a deviation (mm) of the curved surface from a planar surface in contact therewith on the optical axis in a direction along the optical axis at a maximum image height or at a height 0.7 times of a radius of an image circle in a diagonal direction of an effective visual field is represented by $\Delta Z$, a deviation (mm) of the sagittal image surface from the planar surface in contact therewith on the optical axis in the direction along the. optical axis at the maximum image height or the height 0.7 times of the radius of the image circle in the diagonal direction of the image circle is designated by $\Delta S$ and a deviation (mm) of the meridional image surface from the planar surface in contact therewith on the optical axis in the direction along the optical axis at the maximum image height or the height 0.7 times of the radius of the image circle is denoted by $\Delta M$, a condition of $\Delta Z - (\Delta S + \Delta M) = 0$ is a most desirable condition where the mat surface is located between the sagittal image surface and the meridional image surface, thereby obtaining an ideal image surface.

On the other hand, the optical system according to the present invention comprises an image pickup device such as a CCD which is disposed at a location of an image formed by the imaging optical system in an optical path other than the view finder optical path out of the optical paths split by the light splitting means. Since an allowable depth is determined by the pitch ($\mu$m) P of picture elements on the image pickup device and an F number (FNo.) of an optical system of the imaging optical system extended to the primary image surface, and a depth up to 3FNo.×P around an image surface in the desirable condition described above is allowable, it is desirable to satisfy the following condition (7):

$$-3 < (\Delta Z - (\Delta S + \Delta M)/2)/(FNo. \cdot P) < 3 \tag{7}$$

Since an image formed by the secondary imaging type view finder which is composed mostly of positive lens components including the condenser lens component has curvature of field which is convex toward an observer side, it is desirable to dispose the focus confirming means on an image side (observer side) surface of the condenser lens component (convex lens component) located in the vicinity of the secondary imaging surface.

In this case, it is desirable to satisfy the following condition (1):

$$0 < |\Delta Z| < 0.01 \times fe^2 \tag{1}$$

wherein the reference symbol $\Delta Z$ represents a deviation of the curved surface from the planar surface in contact therewith on the optical axis in the direction along the optical axis at the maximum image height or 0.7 times of the radius of the image circle in the diagonal direction of the effective visual field and the reference symbol fe designates a total focal length of an optical system from the surface on which the focus confirming means is disposed to an exit pupil of the eyepiece.

Description will be made of the deviation ΔZ with reference to FIGS. 11A and 11B: FIG. 11A being a front view of the planar surface on which the focus confirming means is disposed and FIG. 11B being a sectional view of the planar surface shown in FIG. 11A. Let us assume that an image surface (not shown) is formed so as to overlap with a focus confirming means 15 and a visual field frame 16 in FIGS. 11A and 11B. A point Q shown in these drawings is located on a diagonal line at a point 0.7 times of its length in a diagonal direction L determined by the visual field frame 16 and a dashed line indicates a height 0.7 times of a maximum image diameter. A deviation of a curved surface S1 from a planar surface S2 which is in contact therewith on an optical axis AX in a direction along the optical axis is ΔZ shown in FIG. 11B.

If $|\Delta|$ exceeds the lower limit of 0 or the upper limit of $0.01 \times fe^2$ of the condition (1), it will be difficult to match the surface of the light scattering mat surface used as the focus confirming means with the curvature of field of the secondary imaging surface, thereby making it difficult to confirm focus to the marginal portion of the visual field.

By forming only the central portion of the curved surface as a planar surface nearly perpendicular to the optical axis and disposing a polygonal pyramidal or conical relief structure or a pair of wedge-shaped prisms on this planar surface, it is possible to obtain a view finder in which microprisms (split image) for the ordinary Leica size single-lens reflex camera coexists with a mat surface.

Figure 14:
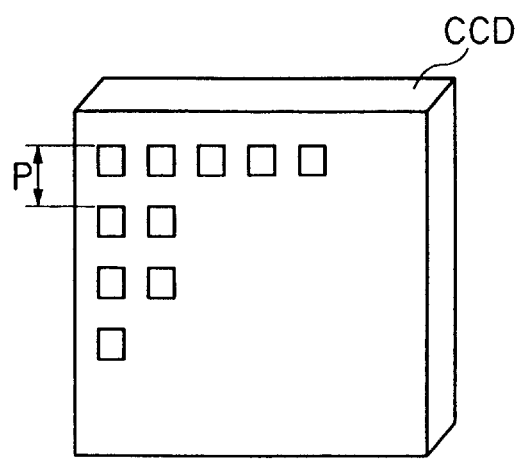
FIG. 14 is a diagram showing an outline of a solid-state image pickup device.

Furthermore, it is desirable that the view finder according to the present invention splits a light bundle which has passed through an image pickup optical system into an image pickup optical path and a view finder optical path by the optical path splitting means described above, comprises an image pickup device disposed at a location of an image of an object formed by an image pickup optical system in the image pickup optical path and a refracting surface on which the focus confirming means composed of the fine structure element described above is disposed in the view finder optical path, and satisfies the following condition (2):

$$0.4 < (n-1) \cdot P \cdot FNo. \cdot \theta / fe < 3 \quad (2)$$

wherein the reference symbol n represents a refractive index of a material of the surface on which the focus confirming means is disposed, the reference symbol P designates a pitch (μm) of picture elements on the image pickup device, the reference symbol FNo denotes an F number of the image pickup optical system (extended to the primary imaging surface), the reference symbol θ represents an angle formed between each fine structure element and the plane perpendicular to the optical axis (unit: degree), and the reference symbol fe designates a total focal length of an optical system from the surface on which the focus confirming means is disposed to a surface of emergence of an eyepiece lens system. The angle θ and the pitch P are visualized in FIG. 10C and FIG. 14 respectively.

If the lower limit of 0.5 of the condition (2) is exceeded, the surface on which the focus confirming means is disposed will be nearly transparent, thereby making it difficult to confirm a focus or if the upper limit of 3 of the condition (2) is exceeded, a portion having the focus confirming surface will easily be blurred, thereby making it difficult to confirm the focus.

Furthermore, it is desirable to satisfy the following condition (3):

$$1 \times 10^{-3} < RP/D < 2 \times 10^{-2} \quad (3)$$

wherein the reference symbol RP represents a pitch (mm) of the relieves of the fine structure and the reference symbol D designates a diameter or a diagonal length of an effective range of visual field for an image on the surface on which the focus confirming means is disposed. The RP is visualized in FIGS. 10B, 12A and 12B.

If the lower limit of $1 \times 10^{-2}$ of the condition (3) is exceeded, the pitch of the relieves of the fine structure will be too narrow and the surface on which the focus confirming means is disposed will be nearly transparent, whereby an image which is out of focus will be deformed too little and it will be difficult to bring the view finder into focus or if the upper limit of $2 \times 10^{-2}$ of the condition (3) is exceeded, the pitch will be too wide, thereby undesirably degrading legibility of the central portion when an image is out of focus.

Furthermore, it is desirable that the view finder according to the present invention satisfies the following condition (4):

$$0.08 < \phi/D < 0.4 \quad (4)$$

wherein the reference symbol φ represents a diameter of the planar surface on which the focus confirming means is disposed.

If φ/D exceeds the lower limit of 0.08 of the condition (4), the focus confirming surface is too small for convenient focus confirmation. If the upper limit of 0.4 of the condition (4) is exceeded, a marginal portion of the focus confirming surface will be easily blurred.

Figure 13:
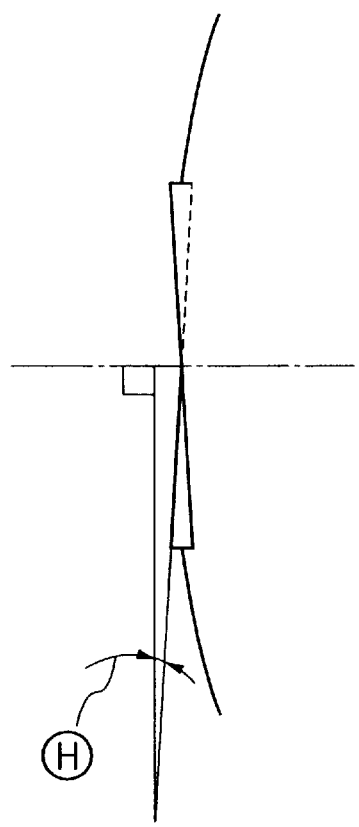
FIG. 13 is a diagram showing still another example of focus confirming means.

When a pair of wedge-shaped prisms such as those shown in FIG. 13 are used as the focus confirming means in the view finder according to the present invention, it is desirable to satisfy the above-mentioned condition (4) and the following condition (2-1):

$$0.4 < (N-1) \times p \times FNo \times \Theta / fe < 3 \quad (2\text{-}1)$$

wherein the reference symbol N represents a refractive index of the wedge-shaped prism and the reference symbol Θ designates an angle formed between a surface of the wedge-shaped prism and a plane perpendicular to the optical axis, or an angle indicated by Θ in FIG. 13.

Now, description will be made of first and second embodiments which have compositions illustrated in FIGS. 1 and 2 respectively, and numerical data listed below:

Embodiment 1

| | | | |
|---|---|---|---|
| $r_1 = 51.2350$ | | | |
| | $d_1 = 4.7000$ | $n_1 = 1.69680$ | $v_1 = 55.53$ |
| $r_2 = \infty$ | | | |
| | $d_2 = 1.0000$ | | |
| $r_3 = 96.1930$ | | | |
| | $d_3 = 1.8000$ | $n_2 = 1.60311$ | $v_2 = 60.64$ |
| $r_4 = 16.3040$ | | | |
| | $d_4 = 4.4000$ | | |
| $r_5 = -164.7960$ | | | |
| | $d_5 = 1.4000$ | $n_3 = 1.51633$ | $v_3 = 64.14$ |
| $r_6 = 14.1320$ | | | |
| | $d_6 = 6.0200$ | | |
| $r_7 = 19.0230$ | | | |
| | $d_7 = 2.2000$ | $n_4 = 1.84666$ | $v_4 = 23.78$ |
| $r_8 = 27.7180$ | | | |
| | $d_8 = 21.8759$ | | |
| $r_9 = \infty$ | | | |
| | $d_9 = 14.8250$ | | |

-continued

| | | | |
|---|---|---|---|
| $r_{10} = 27.6560$ | | | |
| | $d_{10} = 4.4800$ | $n_5 = 1.72916$ | $\nu_5 = 54.68$ |
| $r_{11} = -20.5370$ | | | |
| | $d_{11} = 0.1000$ | | |
| $r_{12} = -18.8270$ | | | |
| | $d_{12} = 0.9000$ | $n_6 = 1.84666$ | $\nu_6 = 23.78$ |
| $r_{13} = -168.9160$ | | | |
| | $d_{13} = 4.5129$ | | |
| $r_{14} = 55.7400$ (aspherical surface) | | | |
| | $d_{14} = 4.0000$ | $n_7 = 1.56014$ | $\nu_7 = 60.00$ |
| $r_{15} = -20.3910$ | | | |
| | $d_{15} = 1.9405$ | | |
| $r_{16} = \infty$ | | | |
| | $d_{16} = 4.0400$ | $n_8 = 1.51633$ | $\nu_8 = 64.14$ |
| $r_{17} = \infty$ | | | |
| | $d_{17} = 4.6700$ | $n_9 = 1.51633$ | $\nu_9 = 64.14$ |
| $r_{18} = \infty$ | | | |
| | $d_{18} = 6.5000$ | | |
| $r_{19} = \infty$ | | | |
| | $d_{19} = 6.6000$ | | |
| $r_{20} = \infty$ | | | |
| | $d_{20} = 0$ | | |
| $r_{21} = 14.3860$ | | | |
| | $d_{21} = 4.0000$ | $n_{10} = 1.49241$ | $\nu_{10} = 57.66$ |
| $r_{22} = -41.7720$ (aspherical surface) | | | |
| | $d_{22} = 5.7000$ | | |
| $r_{23} = \infty$ | | | |
| | $d_{23} = 6.9000$ | | |
| $r_{24} = 6.0580$ | | | |
| | $d_{24} = 5.1000$ | $n_{11} = 1.69680$ | $\nu_{11} = 55.53$ |
| $r_{25} = -31.2530$ | | | |
| | $d_{25} = 0.9100$ | | |
| $r_{26} = -4.4510$ | | | |
| | $d_{26} = 1.6700$ | $n_{12} = 1.59270$ | $\nu_{12} = 35.30$ |
| $r_{27} = 7.8530$ | | | |
| | $d_{27} = 0.4700$ | | |
| $r_{28} = 17.7310$ | | | |
| | $d_{28} = 5.0000$ | $n_{13} = 1.69680$ | $\nu_{13} = 55.53$ |
| $r_{29} = -7.9020$ | | | |
| | $d_{29} = 6.7200$ | | |
| $r_{30} = \infty$ | | | |
| | $d_{30} = 6.9800$ | | |
| $r_{31} = 15.3450$ | | | |
| | $d_{31} = 8.3000$ | $n_{14} = 1.52540$ | $\nu_{14} = 56.25$ |
| $r_{32} = \infty$ | | | |
| | $d_{32} = 6.6500$ | $n_{15} = 1.52540$ | $\nu_{15} = 56.25$ |
| $r_{33} = -30.0820$ | | | |
| | $d_{33} = 27.8767$ | | |
| $r_{34} = 27.7180$ | | | |
| | $d_{34} = 3.5000$ | $n_{16} = 1.49241$ | $\nu_{16} = 57.66$ |
| $r_{35} = -24.7980$ (aspherical surface) | | | |
| | $d_{35} = 15.0000$ | | |
| $r_{36} = \infty$ (eye point) | | | | aspherical surface coefficients
(14th surface)

$K = 0$, $A_4 = -5.5579 \times 10^{-5}$, $A_6 = 2.2107 \times 10^{-7}$
$A_8 = -4.2425 \times 10^{-9}$, $A_{10} = 2.7962 \times 10^{-11}$ (22nd surface)

$K = 0$, $A_4 = -1.5000 \times 10^{-4}$, $A_6 = 1.2000 \times 10^{-6}$
$A_8 = 0$, $A_{10} = 0$ (35th surface)

$K = 0$, $A_4 = 5.6726 \times 10^{-5}$, $A_6 = -2.6809 \times 10^{-6}$
$A_8 = 3.4328 \times 10^{-8}$, $A_{10} = 0$

Embodiment 2

| | | | |
|---|---|---|---|
| $r_1 = 51.2350$ | | | |
| | $d_1 = 4.7000$ | $n_1 = 1.69680$ | $\nu_1 = 55.53$ |
| $r_2 = \infty$ | | | |
| | $d_2 = 1.0000$ | | |
| $r_3 = 96.1930$ | | | |
| | $d_3 = 1.8000$ | $n_2 = 1.60311$ | $\nu_2 = 60.64$ |
| $r_4 = 16.3040$ | | | |
| | $d_4 = 4.4000$ | | |
| $r_5 = -164.7960$ | | | |
| | $d_5 = 1.4000$ | $n_3 = 1.51633$ | $\nu_3 = 64.14$ |
| $r_6 = 14.1320$ | | | |
| | $d_6 = 6.0200$ | | |
| $r_7 = 19.0230$ | | | |
| | $d_7 = 2.2000$ | $n_4 = 1.84666$ | $\nu_4 = 23.78$ |
| $r_8 = 27.7180$ | | | |
| | $d_8 = 21.8759$ | | |
| $r_9 = \infty$ (stop) | | | |
| | $d_9 = 14.8250$ | | |
| $r_{10} = 27.6560$ | | | |
| | $d_{10} = 4.4800$ | $n_5 = 1.72916$ | $\nu_5 = 54.68$ |
| $r_{11} = -20.5370$ | | | |
| | $d_{11} = 0.1000$ | | |
| $r_{12} = -18.8270$ | | | |
| | $d_{12} = 0.9000$ | $n_6 = 1.84666$ | $\nu_6 = 23.78$ |
| $r_{13} = -168.9160$ | | | |
| | $d_{13} = 4.5129$ | | |
| $r_{14} = 55.7400$ (aspherical surface) | | | |
| | $d_{14} = 4.0000$ | $n_7 = 1.56014$ | $\nu_7 = 60.00$ |
| $r_{15} = -20.3910$ | | | |
| | $d_{15} = 1.9405$ | | |
| $r_{16} = \infty$ | | | |
| | $d_{16} = 4.0400$ | $n_8 = 1.51633$ | $\nu_8 = 64.14$ |
| $r_{17} = \infty$ | | | |
| | $d_{17} = 4.6700$ | $n_9 = 1.51633$ | $\nu_9 = 64.14$ |
| $r_{18} = \infty$ | | | |
| | $d_{18} = 6.5000$ | | |
| $r_{19} = \infty$ | | | |
| | $d_{19} = 6.6000$ | | |
| $r_{20} = \infty$ | | | |
| | $d_{20} = 1.7000$ | | |
| $r_{21} = 14.3860$ | | | |
| | $d_{21} = 4.0000$ | $n_{10} = 1.49241$ | $\nu_{10} = 57.66$ |
| $r_{22} = -41.7720$ (aspherical surface) | | | |
| | $d_{22} = 5.7000$ | | |
| $r_{23} = \infty$ | | | |
| | $d_{23} = 6.9000$ | | |
| $r_{24} = 6.0580$ | | | |
| | $d_{24} = 5.1000$ | $n_{11} = 1.69680$ | $\nu_{11} = 55.53$ |
| $r_{25} = -31.2530$ | | | |
| | $d_{25} = 0.9100$ | | |
| $r_{26} = -4.4510$ | | | |
| | $d_{26} = 1.6700$ | $n_{12} = 1.59270$ | $\nu_{12} = 35.30$ |
| $r_{27} = 7.8530$ | | | |
| | $d_{27} = 0.4700$ | | |
| $r_{28} = 17.7310$ | | | |
| | $d_{28} = 5.0000$ | $n_{13} = 1.69680$ | $\nu_{13} = 55.53$ |
| $r_{29} = -7.9020$ | | | |
| | $d_{29} = 6.7200$ | | |
| $r_{30} = \infty$ | | | |
| | $d_{30} = 6.9800$ | | |
| $r_{31} = 15.3450$ | | | |
| | $d_{31} = 8.3000$ | $n_{14} = 1.52540$ | $\nu_{14} = 56.25$ |
| $r_{32} = \infty$ | | | |
| | $d_{32} = 6.6500$ | $n_{15} = 1.52540$ | $\nu_{15} = 56.25$ |
| $r_{33} = -30.0820$ | | | |
| | $d_{33} = 25.3000$ | | |
| $r_{34} = 27.7180$ | | | |
| | $d_{34} = 3.5000$ | $n_{16} = 1.49241$ | $\nu_{16} = 57.66$ |
| $r_{35} = -24.7980$ (aspherical surface) | | | |
| | $d_{35} = 15.0000$ | | |
| $r_{36} = \infty$ (eye point) | | | | aspherical surface coefficients
(14th surface)

$K = 0$, $A_4 = -5.5579 \times 10^{-5}$, $A_6 = 2.2107 \times 10^{-7}$
$A_8 = -4.2425 \times 10^{-9}$, $A_{10} = 2.7962 \times 10^{-11}$ (22nd surface)

$K = 0$, $A_4 = -1.5000 \times 10^{-4}$, $A_6 = 1.2000 \times 10^{-6}$
$A_8 = 0$, $A_{10} = 0$ (35th surface)

$K = 0$, $A_4 = 5.6726 \times 10^{-5}$, $A_6 = -2.6809 \times 10^{-4}$
$A_8 = 3.4328 \times 10^{-8}$, $A_{10} = 0$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements.

The first embodiment illustrated in FIG. 1 is an example wherein focus confirming means is disposed on a primary imaging surface, whereas the second embodiment is an example wherein focus confirming means is disposed on a secondary imaging surface.

In each of the first and second embodiments, reference symbols $r_1$, through $r_{15}$ represent an image pickup optical system, and reference symbols $r_{16}$ through $r_{18}$ designates optical path splitting means which comprises a half mirror $r_{17}$ and is configured to split an optical path into an image pickup side and a view finder side.

Figure 2:
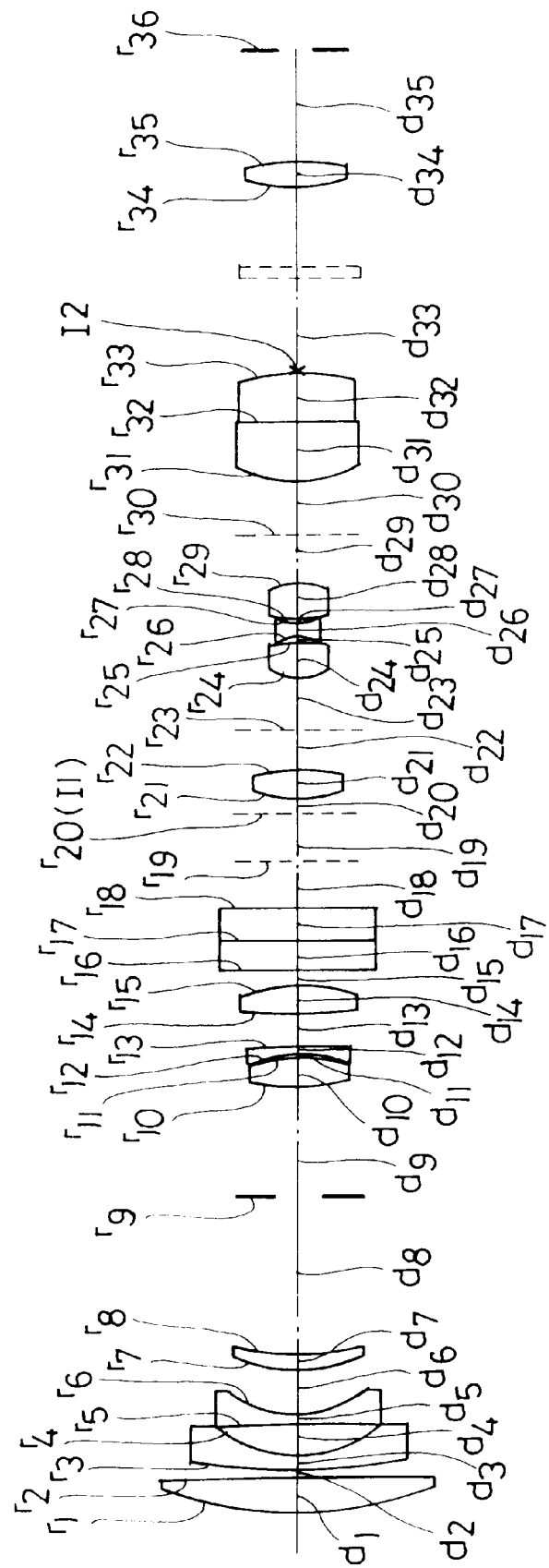
FIG. 2 is a sectional view illustrating a composition of a second embodiment of the view finder according to the present invention.
Figure 3:
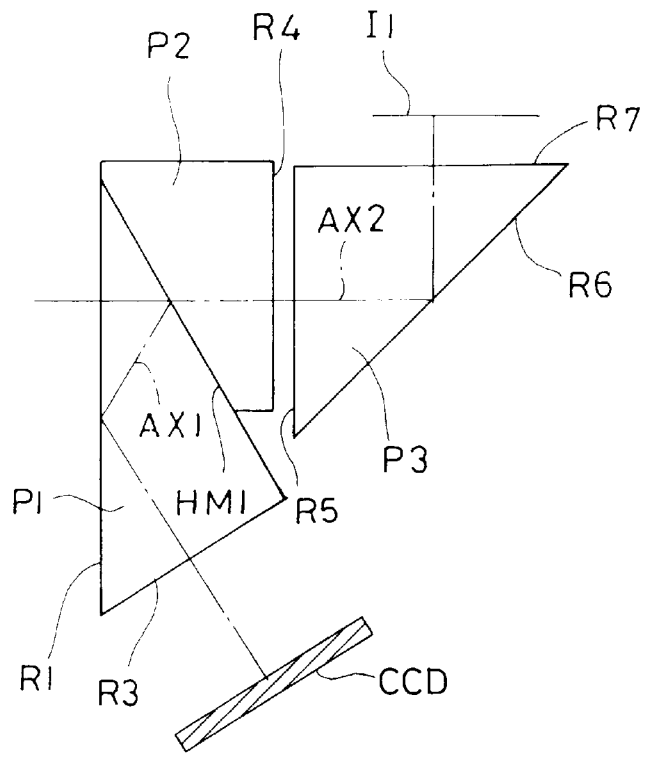
FIG. 3 is a sectional view showing an example of optical path splitting means.

FIG. 3 is a sectional view showing an example of optical path splitting means comprising the half mirror $r_{17}$. In FIG. 3, reference symbols P1, P2 and P3 represent prisms, and a half mirror HM1 is interposed between the prism P1 and the prism P2. A surface of incidence R1 of the prism P1 corresponds to a surface $r_{16}$ of the optical system shown in FIG. 1 or 2, whereas the half mirror HM1 corresponds to a surface $r_{17}$ of the optical system shown in FIG. 1 or 2 and a surface of emergence R2 of the prism P2 corresponds to a surface $r_{18}$ of the optical system shown in FIG. 1 or 2. A ray which is reflected by the half mirror HM1 travels along an optical axis AX1, and is totally reflected by the surface of incidence R1 of the prism P1, allowed to emerge from a surface R3 and imaged on an image pickup device CCD.

A ray which is incident on the surface of incidence R1 of the prism P1 and transmits through the half mirror HM1, on the other hand, travels along an optical axis AX2 on the view finder side. That is, a ray which has transmitted through the half mirror HM1 and is incident on the prism P2 emerges from the surface R4 of the prism P2, and is incident on a surface R5 of the prism P3 and totally reflected by a surface R6, thereafter emerging from a surface R7 and forming a primary image I1. The surface R6 of the prism P3 corresponds to a surface $r_{19}$ of the optical system shown in FIG. 1 or 2 and the image I1 corresponds to a surface $r_{20}$ of the optical system shown in FIG. 1 or 2. A mirror may be disposed in place of the prism P3 at a location of the surface R3.

Figure 4:
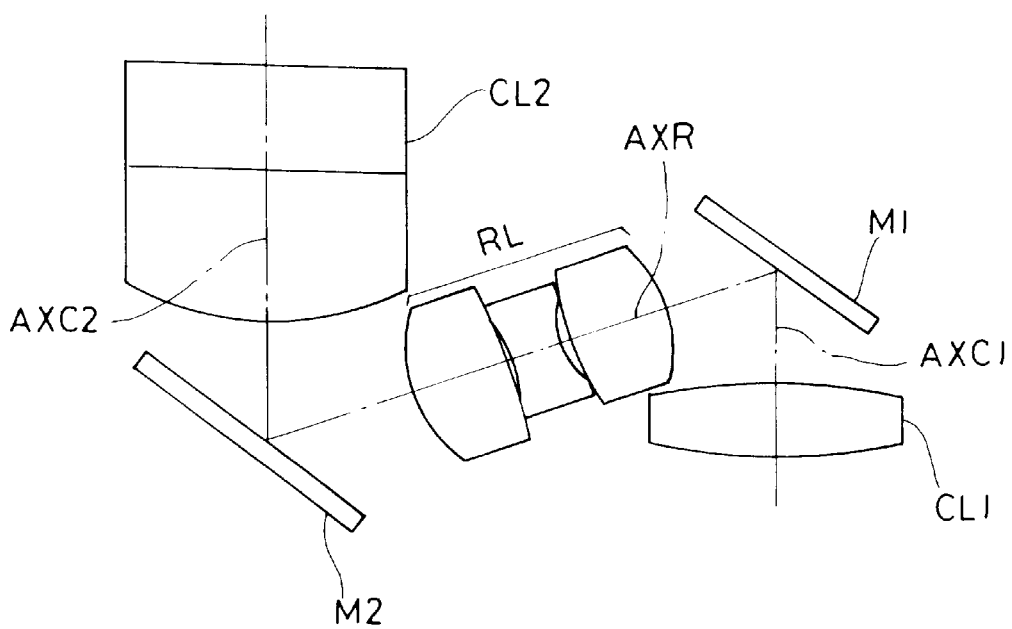
FIG. 4 is sectional view illustrating an optical system from a primary imaging surface to a secondary imaging surface of the view finder optical system according to the present invention.

FIG. 4 shows an optical system from the primary imaging surface after the splitting of the optical path to the secondary imaging surface. In FIG. 4, a reference symbol CL1 represents a first condenser lens, a reference symbol M1 designates a first reflecting mirror, a reference symbol RL denotes a relay lens system and a reference symbol M2 represents a second condenser lens. The optical system is configured so that the ray emerging from the prism P3 in FIG. 3 travels along an optical axis AXC1 of the first condenser lens, passes through the first condenser lens CL1 travels along an optical axis AXR which is folded by the first reflecting mirror M1, passes through a relay lens system RL and is reflected by the second reflecting mirror M2, thereafter travelling along a folded optical axis AXC2 as shown in FIG. 4.

Figure 5:
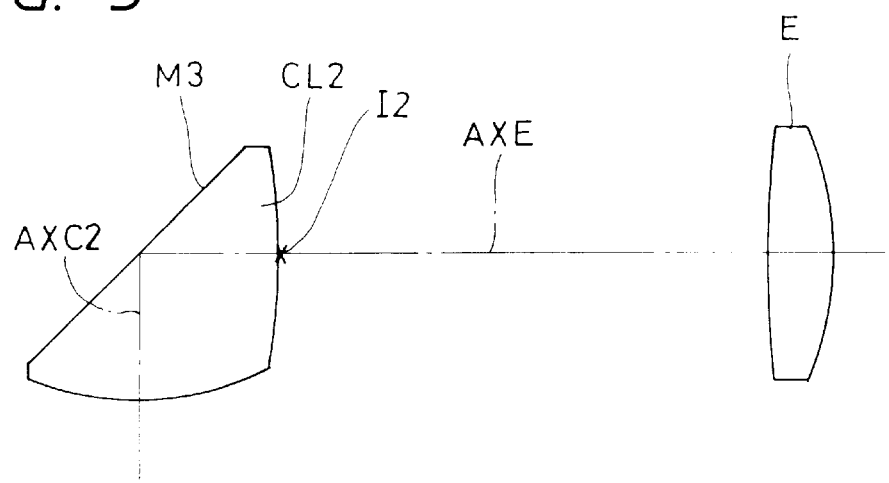
FIG. 5 is a sectional view illustrating an optical system from the secondary imaging surface to an eyepiece optical system of the view finder optical system according to the present invention.

FIG. 5 shows an optical system from the vicinity of a secondary imaging surface I2 to an eyepiece system E. Shown in this drawing is an optical system from the second condenser lens CL2 to the eyepiece system E. It is preferable to arrange the second condenser lens CL2 so that either surface of the positive lens component (the second condenser lens) CL2 shown in FIG. 5 is coincident with the secondary imaging surface I2 and dispose the focus confirming means on this secondary imaging surface.

The first condenser lens CL1, the first reflecting mirror M1, the relay lens system RL, the second reflecting mirror M2 and the second condenser lens CL2 which are shown in FIGS. 4 and 5 correspond to $r_{21}$ through $r_{22}$, $r_{23}$, $r_{24}$ through $r_{29}$, $r_{30}$, and $r_{31}$ through $r_{33}$ respectively shown in FIG. 1 or 2.

The first embodiment shown in FIG. 1 is configured to locate an object side surface $r_{21}$ of the first condenser lens CL1 at a first imaging surface $r_{20}$ and dispose the focus confirming means on a surface $r_{21}$, whereas the second embodiment shown in FIG. 2 is configured to locate the surface $r_{21}$ not at the primary imaging surface but locate an eye side surface of the second condenser lens CL2 at the secondary imaging surface I2 and dispose the focus confirming means at a center of this surface.

Figure 10A:
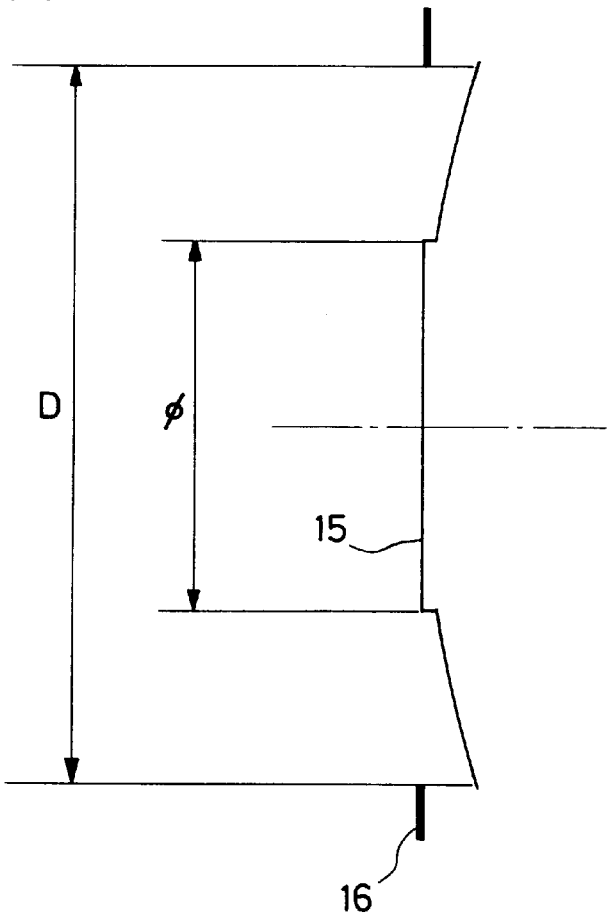
FIGS. 10A through 10C are diagrams showing an example of focus confirming means.
Figure 10B:
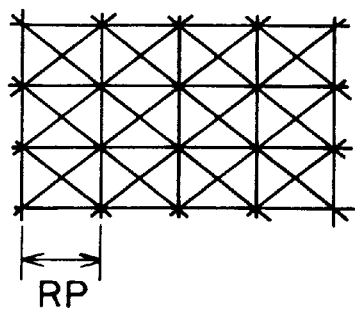
Figure 10C:
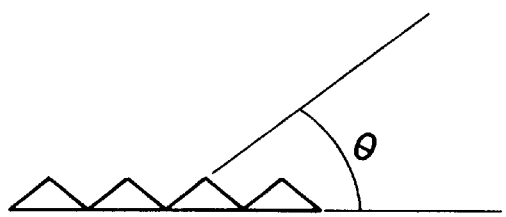

In the optical system preferred as the first embodiment, the total focal length fe of the optical system from the surface $r_{11}$ on which the focus confirming means is disposed to the surface of emergence of the eyepiece optical system is 21.952 mm, the diagonal length D of the visual field frame is 10.45 mm, the focus confirming means composed of the fine relief pattern of the quadrangular pyramids shown in FIGS. 10A, 10B and 10C is disposed only on a central portion of the surface $r_{21}$ and portion of the surface $r_{21}$ other than the portion on which the focus confirming means is disposed is configured as a transparent surface having a power.

In the first embodiment, a material of the surface on which the fine relief pattern is disposed as the focus confirming means has a refractive index n of 1.49241, and angle $\theta$ formed between the fine relief and the plane perpendicular to the optical axis is 0.97°, the pitch RP of the fine relieves is 12 $\mu$m and the focus confirming means has a diameter $\phi$ of 4 mm.

Furthermore, the pitch P of the picture elements on the image pickup device is 6.7 $\mu$m and the F number (FNo) of the imaging optical system which is prolonged to the primary imaging surface is 2.8.

Accordingly, the first embodiment has values which are listed below as those corresponding to the conditions (2), (3) and (4):

$$(n-1) \cdot P \cdot FNo \cdot \theta / Fe = 0.408 \quad (2)$$

$$RP/D = 1.148 \times 10^{-2} \quad (3)$$

$$\phi/D = 0.383 \quad (4)$$

Furthermore, the angle $\theta$ formed between each fine relief and the plane perpendicular to the optical axis may be modified to 1.94°, 3.88° or 5° within a range where the above-mentioned conditions are satisfied.

Furthermore, the imaging optical system may be configured as a vari-focal optical system so that the F number (FNo) of the imaging optical system which is terminated by the primary imaging surface can be modified within a range from 2.8 to 3.9.

When the angle $\theta$ is 5° and the F number (FNo) of the imaging optical system which is prolonged to the primary imaging surface is 3.9 with the other values kept unchanged from those mentioned above, for example, the first embodiment has a value of 2.931 as that corresponding to the condition (2) and satisfies the condition (2).

When the pitch RP of the fine relieves is 20 $\mu$m, the RP/D defined by the condition (3) has a value of $1.914 \times 10^{-3}$ and satisfies the condition (3).

Even when, the diameter $\phi$ of the focus confirming means is 1 mm, $\phi/D$ has a value of $0.096 \times 10^{-3}$ and satisfies the condition (4).

In the optical system preferred as the first embodiment, the focus confirming means may not be disposed on the surface $r_{21}$ but the surface $r_{21}$ may be configured as a transparent surface consisting only of a curved surface and an entire surface mat m which is composed of curved surfaces as indicated by a dashed line in FIG. 1 may be disposed all over the location of the secondary imaging surface $I_2$. In this case, the visual field frame is disposed in the vicinity of the secondary imaging surface.

Figure 15:
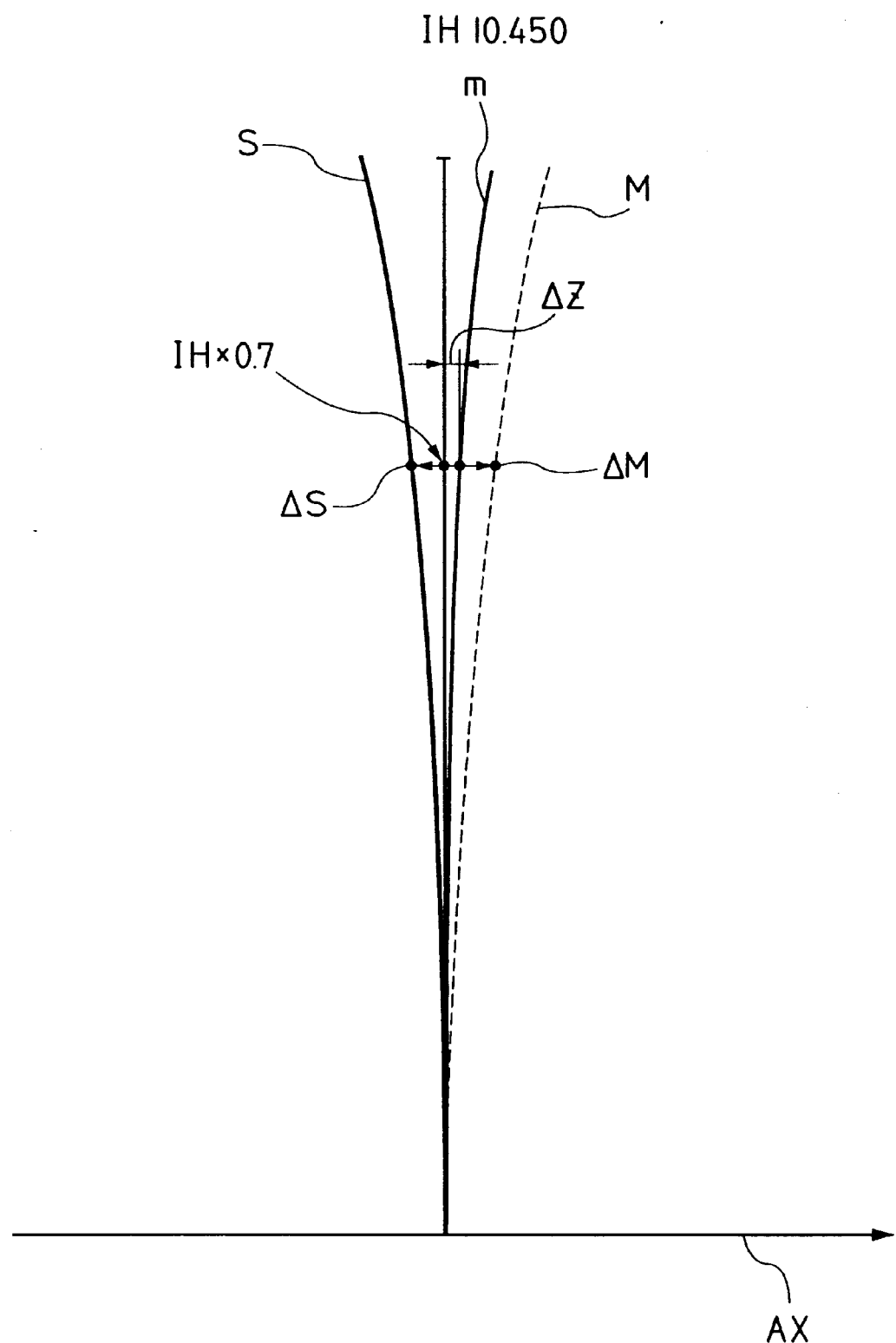
FIG. 15 is a diagram showing relationship between a surface on which the focus confirming means is disposed and an image surface formed by the imaging optical system used in the view finder according to the present invention.

It is conceivable to configure the entire surface mat m so as to have a shape which is exemplified in FIG. 15. In FIG. 15, a reference symbol S represents a sagittal image surface, a reference symbol M designates a meridional image surface, a reference symbol m denotes the mat m, $\Delta z$ is 0.05152, $\Delta S$ at the image height of 0.7 (IH×0.7) is −0.43800 and $\Delta M$ is 0.54104. Furthermore, a reference symbol AX represents an optical axis and an image height on the secondary imaging surface is 10.450 mm. A deviation $\Delta Z$ of a surface of the mat surface m has a value between $\Delta S$ and $\Delta M$, and a focus confirmation accuracy is enhanced by deviating the surface of the mat m from the planar surface in contact therewith on the optical axis of the image surfaces. This mat m has a value of $\Delta Z−(\Delta S+\Delta M)/2=0$ as that corresponding to the condition (7), thereby zeroing the condition (7) as calculated below:

$$(\Delta Z-(\Delta S+\Delta M)/2)/(FNo \cdot P)=0 \tag{7}$$

Furthermore, the first embodiment permits confirming focus favorably over the entire range of the image surface by configuring the mat m so that it has a curved shape which is entirely located between the sagittal image surface S and the meridional image surface M.

Since focus can be confirmed favorably so far as the surface of the mat m is located within a range where it satisfies the condition (7), the mat m may be configured so that it has a shape which is coincident with the sagittal image surface S or the meridional image surface M.

Furthermore, the surface of the mat m has $|\Delta Z|$ of 0.0512 and $0.01 \times fe^2$ of 4.819, thereby satisfying the condition (1).

The surface of the mat m may be a sandblasted surface or have the conical relief pattern shown in FIG. 10A, FIG. 10C and FIG. 12B which is formed over an entire range of the surface.

In the optical system preferred as the second embodiment wherein the visual field frame has a diagonal length D of 12.6 mm, the fine relief pattern of the cones shown in FIG. 10A, FIG. 10C and FIG. 12B is disposed as the focus confirming means only on a central portion of the surface $r_{33}$.

A refractive index of the surface on which the fine relief pattern is disposed as the focus confirming means is 1.52540, the angle θ formed between each fine relief and the plano perpendicular to the optical axis is 1.13°, the pitch RP of the fine relieves is 14 μm and the diameter φ of the focus confirming means is 5 mm.

Furthermore, the pitch P of picture elements on the image pickup device is 6.7 μm and the F number (FNo) of the imaging optical system which is prolonged to the primary imaging surface is 2.8.

Accordingly, the second embodiment has values listed below as those corresponding to the conditions (2), (3) and (4):

$$(n-1) \cdot P \cdot FNo \cdot \theta/fe=0.410 \tag{2}$$

$$RP/D=1.111 \times 10^{-2} \tag{3}$$

$$\phi/D=0.397 \tag{4}$$

Furthermore, the angle θ between each fine relief and the plane perpendicular to the optical axis may be modified to 2.26°, 4.52° or 5.81° within the range defined by the condition (2).

Furthermore, the imaging optical system may be configured as a vari-focal optical system so that the F number (FNo) of this vari-focal optical system which is prolonged to the primary imaging surface can be changed within a range from 2.8 to 3.9.

When the angle θ is 5.81° and the F number (FNo) of the vari-focal optical system which is terminated by the primary imaging surface is 3.9 with the other values kept unchanged from those described above, the second embodiment has a value of 2.935 as that corresponding to the condition (2), thereby satisfying the condition (2).

Even when the pitch RP of the fine relieves is set at 24 μm, the second embodiment has a value of $1.905 \times 10^{-2}$ as that RP/D corresponding to the second embodiment, thereby satisfying the condition (3).

Even when the diameter φ of the focus confirming means is set at 1 mm, the second embodiment has a value of $0.098 \times 1^{-3}$ as that of φ/D corresponding to the condition (4), thereby satisfying the condition (4).

In addition to the quadrangular pyramidal relief pattern and the conical relief pattern, other pyramidal patterns such as a hexagonal pyramidal pattern and a triangular pyramidal pattern, a light scattering surface such as a sandblasted surface or a pair of wedge-shaped prisms may also be used as the focus confirming means in the second embodiment.

Figure 6:
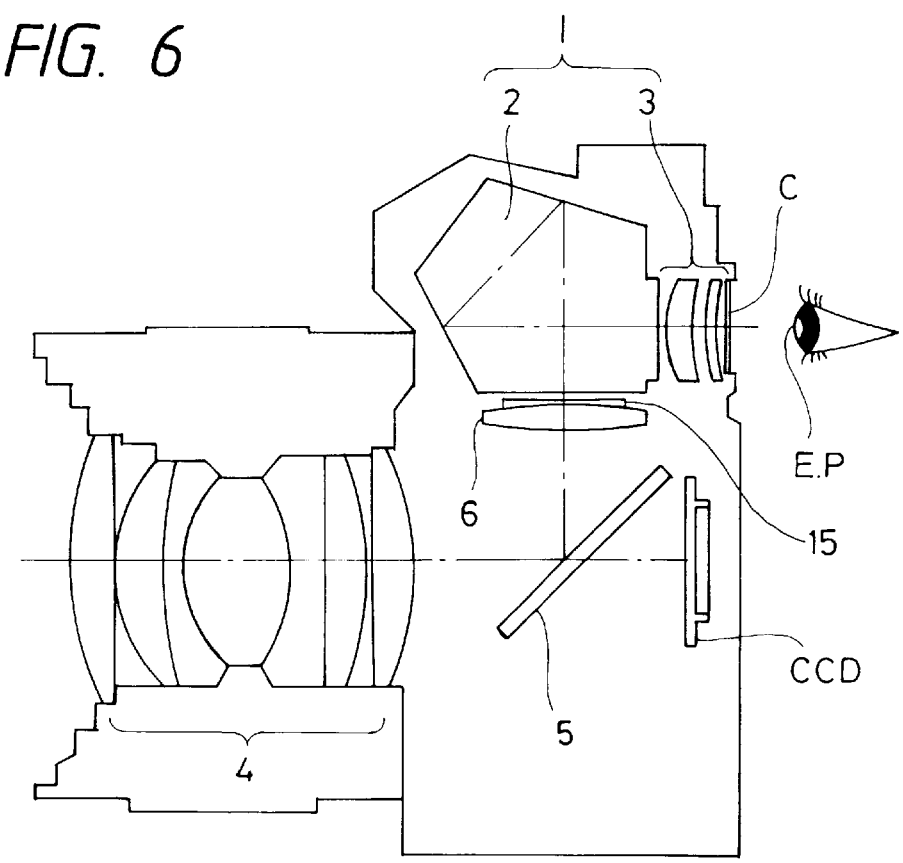
FIG. 6 is a sectional view illustrating a camera which uses the view finder according to the present invention comprising an image inverting optical system.

FIG. 6 shows an example of view finder which uses an image inverting optical system. In FIG. 6, a reference numeral 1 represents a view finder optical system, a reference numeral 2 designates an image inverting system, a reference numeral 3 denotes an eyepieces, a reference numeral 4 represents a photographic lens system, a reference numeral 5 designates optical splitting means, a reference numeral 6 denotes a positive lens component, a reference symbol C represents a cover glass plate and a reference symbol EP designates an eye point. Used herein as an image inverting system is a pentagonal prism which has a surface of incidence, a reflecting surface, a roof reflecting surface and a surface of emergence. The optical path splitting means 5 may be a plane parallel plate having a half mirror or the so-called quick return mirror.

Figure 7:
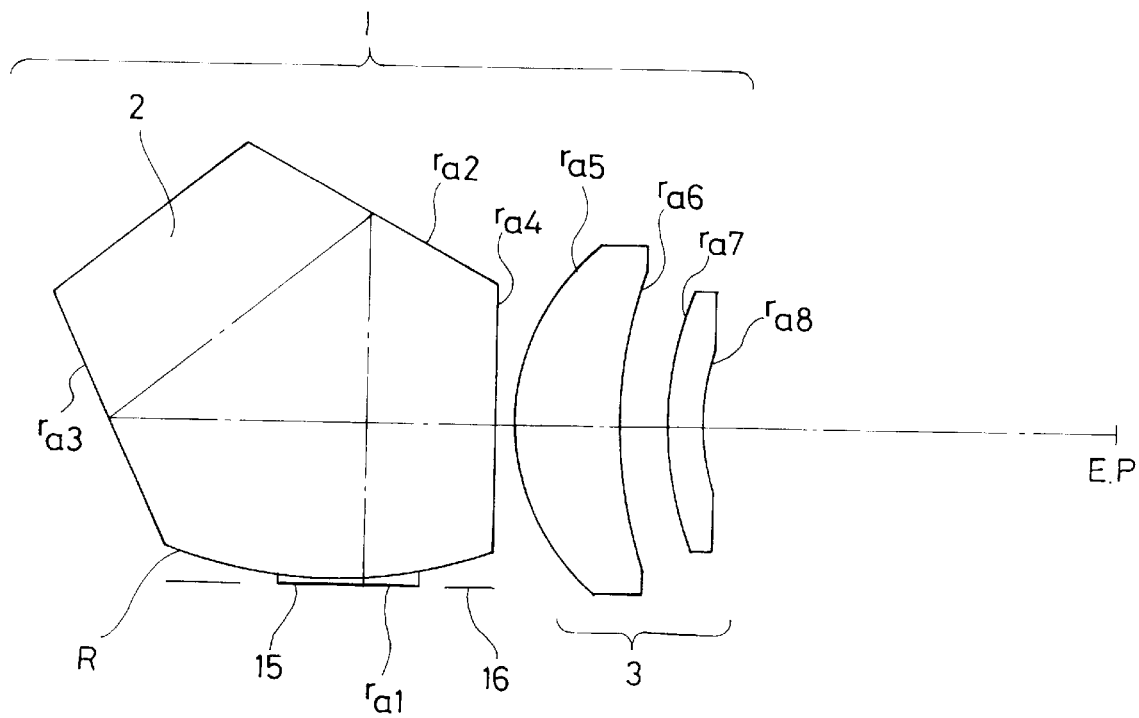
FIG. 7 is a sectional view showing another example of the view finder according to the present invention which uses an image inverting optical system.

FIG. 7 shows an example wherein the positive lens component 6 is not used but the surface R is configured as a surface having a refractive power in the view finder which uses the image inverting system shown in FIG. 6. That is, the surface R is configured as a refracting surface, and a central portion of the surface R is configured as a planar surface nearly perpendicular to the optical axis and located on the primary imaging surface. The focus confirming means described above is disposed on this planar surface.

The eyepiece of the view finder which has the configuration shown in FIGS. 6 and 7 comprises, in order from the object side, a positive lens component having a convex surface on the object side and a lens component having a concave surface on the image side, and is configured to satisfy the following conditions (5) and (6):

$$-6<(R_{31}+R_{32})/(R_{31}-R_{32})<-0.1 \tag{5}$$

$$0.1<(R_{33}+R_{34})/(R_{33}-R_{34})<15 \tag{6}$$

wherein the reference symbols $R_{31}$ and $R_{32}$ represent radii of curvature on an object side surface and an observer side surface respectively of the lens component disposed on the object side in the eyepiece shown in FIGS.

6 and 7, and the reference symbols $R_{33}$ and $R_{34}$ designate radii of curvature on an object side surface and an image side surface of an image side lens component of the eyepiece shown in FIGS. 6 and 7.

If the upper limit of −0.1 of the condition (5) is exceeded, spherical aberration and coma will be aggravated in the eyepiece, thereby making viewing performance of the eyepiece not preferable. If the lower limit of −6 of the condition (5) is degraded, in contrast, it will be impossible to reserve a space for interposing an image erecting prism or enhance a viewing magnification, thereby providing a small image to be observed.

If the upper limit of 15 of the condition (6) is exceeded, it will be impossible to reserve the space to interpose the image erecting system or enhance the viewing magnification, thereby providing a small image to be observed. If the lower limit of 0.1 of the condition (6) is exceeded, in contrast, spherical aberration and coma will be aggravated in the eyepiece, thereby making the viewing performance of the eyepiece not preferable.

The eyepiece system shown in FIG. 7 has numerical data which is listed below:

Height of an image observed through the eyepiece optical system 3=5.00 mm $r_1 = \infty$ (entrance surface)
$\quad d_1 = 13.3663 \quad nd_1 = 1.60311 \quad vd_1 = 60.68$
$r_2 = \infty$ (reflecting surface)
$\quad d_2 = -12.5000 \quad nd_2 = 1.60311 \quad vd_2 = 60.68$
$r_3 = \infty$ (root reflecting surface)
$\quad d_3 = 15.0000 \quad nd_3 = 1.60311 \quad vd_3 = 60.68$
$r_4 = -288.0113$ (exit surface)
$\quad d_4 = 0.5000$
$r_5 = 7.6141$
$\quad d_5 = 4.0000 \quad nd_5 = 1.60311 \quad vd_5 = 60.68$
$r_6 = 16.5480$ (aspherical surface)
$\quad d_6 = 1.8283$
$r_7 = 10.5578$ (aspherical surface)
$\quad d_7 = 1.2000 \quad nd_7 = 1.80518 \quad vd_7 = 25.43$
$r_8 = 8.4362$
$\quad d_8 = 15.4907$
$r_9 = \infty$ (eye point)

conical coefficients and aspherical surface coefficients (6th surface) $\quad K = 0, \quad A_4 = 2.4415 \times 10^{-5},$
$\qquad A_6 = 1.5628 \times 10^{-6}, A_8 = 0$
(7th surface) $\quad K = 0, \quad A_4 = -3.2789 \times 10^{-4},$
$\qquad A_6 = -5.8462 \times 10^{-6}, A_8 = 0$
$(R_{31} + R_{32})/(R_{31} - R_{32}) = -2.705$
$(R_{33} + R_{34})/(R_{33} - R_{34}) = 8.953$ wherein the reference symbols $r_{a1}, r_{a2}, \ldots$ represent radii of curvature on the surfaces shown in FIG. 17, the reference symbols $d_{a1}, d_{a2}, \ldots$ designate airspaces reserved between the surfaces mentioned above, the reference symbols $nd_{a1}, nd_{a2}, \ldots$ denote refractive indices of the prisms, lens elements, etc. for the d-line, and the reference symbols $vd_{a1}, vd_{a2}, \ldots$ denote Abbe's numbers of the prisms, lens elements, etc.

In the numerical data listed above, the reference symbols $r_{a5}, r_{a6}, r_{a7}$ and $r_{a8}$ correspond to $R_{31}, R_{32}, R_{33}$ and $R_{34}$ respectively in the conditions (5) and (6).

When the focus confirming means 15 is disposed on the observer side curved surface of the positive lens component 6 uses as a condenser lens as shown in FIG. 6, the surface $r_{a1}$ may be configured as a transparent planar surface and $d_{a1}$ may be set at 13.3663 in the numerical data of the eyepiece optical system shown above so that the focus confirming means on the positive lens component 6 is disposed at a location shifted for a distance of 1.2963 mm from the surface $r_{a1}$ toward the optical path splitting means.

Usable as this focus confirming means are various kinds of focus confirming means described above. In such a case, it is desirable to configure the second embodiment so as to satisfy the conditions described above.

Figure 8:
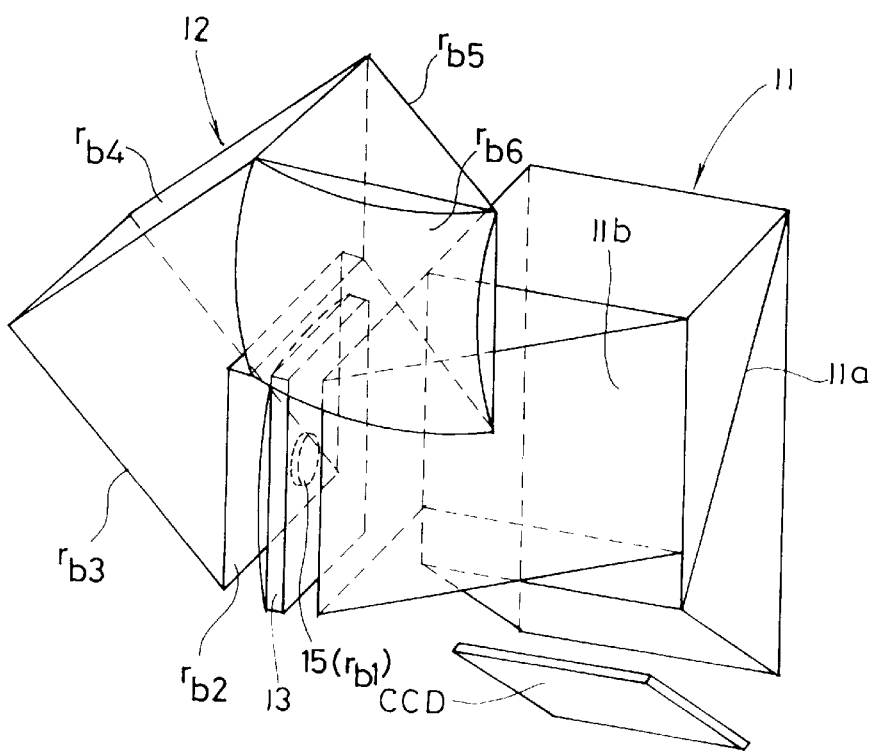
FIG. 8 is a diagram showing the view finder according to the present invention which uses an image inverting optical system composed of Porro prisms.

Furthermore, FIG. 8 shows an example wherein the image inverting system is composed of Porro prisms. In FIG. 8, a reference numeral 11 represents optical path splitting means (an optical path splitting prism), a reference numeral 11a designates a half mirror, a reference numeral 11b denotes a totally reflecting surface, a reference numeral 12 represents a prism system composed of the Porro prisms and a reference numeral 13 designates a lens system such as a condenser lens system. It is sufficient to locate any one of surfaces in this lens system in coincidence with the primary imaging surface and dispose the focus confirming means on this surface.

Also usable as the focus confirming means in this embodiment are various kinds of focus confirming means which are described above. In this case also, it is desirable to satisfy the conditions mentioned above.

When the observer's eye of the condenser lens system 13 is configured as the curved surface and the focus confirming means 15 which is configured as the nearly planar surface is disposed on the central portion of the curved surface, an optical system from the focus confirming means 15 to the observer's eye and the eyepiece system have numerical data which is listed below:

$r_1 = \infty$ (focus confirming means)
$\quad d_1 = -1.0017$
$r_2 = \infty$ (transmitting surface)
$\quad d_2 = -4.4000 \quad nd_1 = 1.52540 \quad vd_1 = 56.25$
$r_3 = \infty$ (reflecting surface)
$\quad d_3 = 11.9000 \quad nd_2 = 1.52540 \quad vd_2 = 56.25$
$r_4 = \infty$ (reflecting surface)
$\quad d_4 = -13.3000 \quad nd_3 = 1.52540 \quad vd_3 = 56.25$
$r_5 = \infty$ (reflecting surface)
$\quad d_5 = 8.4000 \quad nd_4 = 1.52540 \quad vd_4 = 56.25$
$r_6 = -27.1980$ (transmitting surface)
$\quad d_6 = 0.3000$
$r_7 = 14.9070$
$\quad d_7 = 6.1000 \quad nd_5 = 1.49241 \quad vd_5 = 57.66$
$r_8 = -27.4380$ (aspherical surface)
$\quad d_8 = 2.3000$
$r_9 = -48.0090$ (aspherical surface)
$\quad d_9 = 1.3000 \quad nd_6 = 1.58423 \quad vd_6 = 30.49$
$r_{10} = 23.7540$
$\quad d_{10} = 15.5000$
$r_{11} = \infty$ (eye point)

conical coefficients and aspherical surface coefficients (8th surface) $\quad K = 0, A_4 = 1.0531 \times 10^{-4},$
$\qquad A_6 = -7.7711 \times 10^{-7}, A_8 = 4.5344 \times 10^{-9}$
(9th surface) $\quad K = 0, A_4 = 5.1686 \times 10^{-5},$
$\qquad A_6 = -7.8733 \times 10^{-7}, A_8 = 4.1723 \times 10^{-9}$
$(R_{31} + R_{32})/(R_{31} - R_{32}) = -0.296$
$(R_{33} + R_{34})/(R_{32} - R_{34}) = 0.338$ In the numerical data of the embodiments described above, the reference symbols $r_{b1}, r_{b2}, \ldots$ represent radii of curvature on surfaces of respective optical elements such as lens elements, the reference symbols $d_{b1}, d_{b2}, \ldots$ designate thicknesses of the respective optical elements and airspaces reserved therebetween, the reference symbols $nd_{b1}, nd_{b2}, \ldots$ denote refractive indices of the respective optical elements for the d-line (567.56 nm), and the reference symbols $vd_{b1}, vd_{b2}, \ldots$ represent Abbe's numbers of the respective optical elements.

In addition, the reference symbols $r_{b7}, r_{b8}, r_{b9}$ and $r_{b10}$ represent radii of curvature on surfaces of an eyepiece optical system (not shown) which correspond to $R_{31}, R_{32}, R_{33}$ and $R_{34}$ respectively in the conditions (5) and (6).

In addition, shapes of the a spherical surfaces described above are expressed by the following formula:

$$x = \frac{Y^2/r}{1+\sqrt{1-(1+K)(Y/r)^2}} + A_4 Y^4 + A_6 Y^6 + A_8 Y^8$$

Figure 9A:
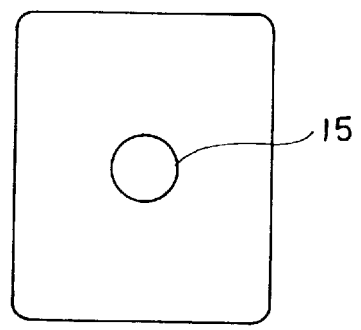
FIGS. 9A through 9E are diagrams showing a configuration of an optical element on which focus confirming means is disposed.
Figure 9B:
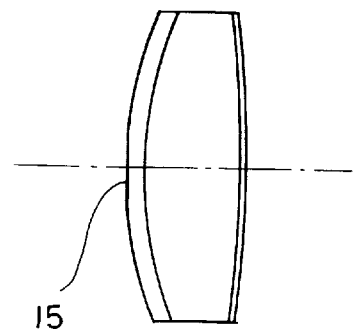
Figure 9C:
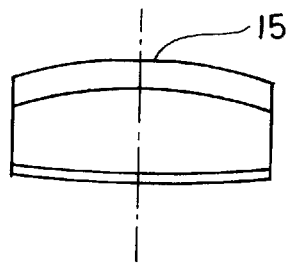
Figure 9D:
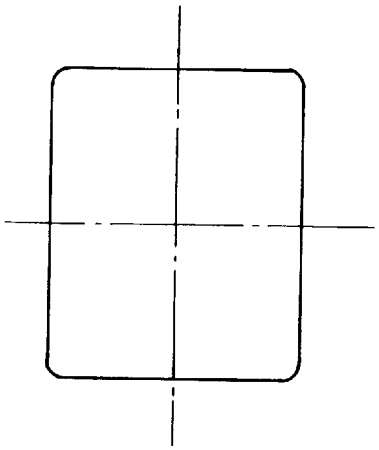
Figure 9E:
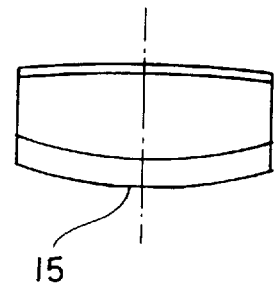

FIGS. 9A through 9B show a portion (portion of a planar surface) of the positive lens component on which the focus confirming means is to be disposed: FIG. 9A being a front view, FIG. 9B being a side view, FIG. 9C being a plan view, FIG. 9D being a rear view and FIG. 9E being a bottom view. In these drawings, a reference numeral 15 represents the portion of the planar surface on which the focus confirming means is to be disposed.

FIGS. 10A through 10C show an example of focus confirming means: FIG. 10A being a side view showing a planar surface portion 15 on which focus confirming means is to be disposed, FIG. 10B being a front view of the focus confirming means disposed on the planar surface portion shown in FIG. 10A and FIG. 10C being a sectional view of the focus confirming means.

FIGS. 12A, 12B and 13 show other examples of focus confirming means: FIG. 12A showing hexagonal pyramidal focus confirming means, FIG. 12B showing conical focus confirming means and FIG. 13 showing focus confirming means composed of wedge-shaped prisms. Furthermore, FIG. 14 visualizes a concept of a solid state image pickup device CCD.

Though the view finder according to the present invention has two refracting surfaces, it allows a photographic lens system to be brought in accurate focus while preventing an image from being eclipsed and making a manufacturing defect of a fine structure unnoticeable.

What is claimed is:

1. A single-lens reflex view finder comprising:
   an optical path splitter configured to split at least a partial amount of a light bundle transmitting through an imaging optical system configured to pick up an image of an object as a view finder optical path for observing said object;
   a refracting surface disposed at a location of an optional image formed in said view finder optical path split by said optical path splitting means; and
   a focus confirming unit disposed only on a central portion of said refracting surface,
   wherein a circumferential portion of said central portion is a stepless smooth curved surface having power and being transparent.

2. A single-lens reflex view finder comprising:
   an optical path splitter configured to split at least a partial amount of a light bundle transmitting through an imaging optical system configured to pick up an image of an object as view finder optical path for observing said object;
   a reimaging optical system disposed after a location of a primary image formed in the view finder optical path split by said optical path splitting means, said reimaging optical system having a magnification of at least 1×;
   a surface having a refractive power disposed at a location of a secondary image formed by said reimaging optical system; and
   a focus confirming unit disposed only on a central portion of said surface having the refractive power,
   wherein a circumferential portion of said central portion is a stepless smooth curved surface having power and being transparent.

3. A single-lens reflex view finder comprising:
   an optical path splitter configured to split at least a partial amount of a light bundle transmitting through an imaging optical system configured to pick up an image of an object as a view finder optical path for observing said object;
   a reimaging optical system disposed after a location of a primary image formed in the view finder optical path split by said optical path splitting means, said reimaging optical system having a magnification of at least 1×;
   a refracting surface having a shape along curvature of field of a secondary image formed by said reimaging optical system;
   a focus confirming unit disposed over an entire surface of said refracting surface; and
   an image pickup device disposed at a location of an image formed by said imaging optical system in an optical path other than the viewfinder optical path split by said optical path splitting means, wherein said curved surface satisfies the following condition (7):

$$-3 < (\Delta Z - (\Delta S + \Delta M)/2)/(FNo \cdot P) < 3 \qquad (7)$$

wherein the reference symbol ΔZ represents a deviation (mm) of the curved refracting surface from a planar surface in contact therewith on the optical axis in a direction along the optical axis at a maximum image height or at a location 0.7 times of a radius of an image circle in a diagonal direction of an effective visual field, the reference symbols DS and DM designate deviations of a sagittal image surface and a meridional image surface respectively from a planar surface in contact therewith on an optical axis in the direction along the optical axis at the maximum image height or at the location of 0.7 times of the radius of the image circle in the diagonal direction of the effective visual field, the reference symbol P denotes a pitch (μm) of picture elements on an image pickup device, and the reference symbol FNo represents an F number of the imaging optical system to its primary image surface.

4. A single-lens reflex view finder comprising, in order from the object side:
   an imaging optical system configured to pick up an image of an object;
   an optical path splitter disposed between said imaging optical system and an image formed by said imaging optical system;
   an image pickup surface disposed in one of optical paths split by said optical path splitting means; and
   a view finder system disposed in the other optical path split by said optical path splitting means,
   wherein said view finder system comprises, in order from said optical path splitter,
   a positive lens component,
   a first reflecting mirror for folding an optical axis,
   a reimaging optical system,
   a second reflecting mirror for folding the optical axis,
   a positive lens system comprising a reflecting surface for folding the optical axis and
   an eyepiece optical system,
   wherein a surface which has focus confirming means disposed on a central portion thereof and a converging function is disposed in said positive lens component or said positive lens system comprising the reflecting surface, and wherein a circumferential portion of said central portion is a stepless smooth curved surface which has power and is transparent.

5. A single-lens reflex view finder comprising, in order from the object side:
an imaging optical system configured to pick up an image of an object;
an optical path splitter disposed between said imaging optical system and an image formed by said imaging optical system;
an image pickup surface disposed in one of optical paths split by said optical path splitter; and
a view finder system disposed in the other optical path split by said optical path splitter,
wherein said view finder system comprises
a pentagonal roof prism which has a surface of incidence,
a reflecting surface, a reflecting roof surface and a surface of emergence, and
an eyepiece optical system,
wherein said view finder comprises at least a surface having a converging function which is disposed between said optical path splitter and the reflecting surface of said pentagonal roof prism,
wherein said surface having the converging function has focus confirming means which is disposed on a central portion thereof, and
wherein a circumferential portion of said central portion is a stepless smooth curved surface which has power and is transparent.

6. A single-lens reflex view finder comprising, in order from the object side:
an imaging optical system configured to pick up an image of an object;
an optical path splitter disposed between said imaging optical system and an image formed by said imaging optical system;
an image pickup surface disposed in one of optical paths split by said optical path splitter; and
a view finder system disposed in the other optical path split by said optical path splitter,
wherein said view finder system comprises, in order from said optical path splitting means,
a plurality of reflecting surfaces for holding an optical axis, and
an eyepiece optical system,
wherein at least a surface having a converging function is disposed between said optical path splitting means and said first reflecting surface,
wherein focus confirming means is disposed on a central portion of said surface having the converging function, and
wherein a circumferential portion of said central portion is a stepless smooth curved surface which has power and is transparent.

7. A single-lens reflex view finder comprising, in order from the object side:
an imaging optical system configured to pick up an image of an object;
an optical path splitter disposed between said imaging optical system and an image formed by said imaging optical system;
an image pickup surface disposed in one of optical paths split by said optical path splitter; and
a view finder system disposed in the other optical path split by said optical path splitter, wherein said view finder system is composed of an image erecting optical system comprising a plurality of reflecting surfaces and an eyepiece optical system,
wherein said view finder comprises at least a surface having a converging function, said surface being disposed between said optical path splitting means and said reflecting surfaces,
wherein said surface having the converging function has a focus confirming unit disposed on a central portion thereof,
wherein a circumferential portion of said central portion is a stepless smooth curved surface which has power and is transparent and
wherein said eyepiece optical system comprises, in order from the object side, a positive lens component having a convex surface on the object side and two negative lens components having concave surfaces on an observer side, and satisfies the following conditions (5) and (6):

$$-6 < (R_{31}+R_{32})/(R_{31}-R_{32}) < -0.1 \quad (5)$$

$$0.1 < (R_{33}+R_{34})/(R_{33}-R_{34}) < 15 \quad (6)$$

wherein the reference symbols $R_{31}$ and $R_{32}$ represent radii of curvature on an object side surface and an image side surface respectively of the positive lens component of the eyepiece optical system, and the reference symbols $R_{33}$ and $R_{34}$ designate radii of curvature on an object side surface and an image side surface respectively of the negative lens components of the eyepiece optical system.

8. The single-lens reflex view finder according to claim 1, 2, 3, 4, 5, 6 or 7, wherein said focus confirming unit consists of a plurality of planar surfaces, said planar surfaces being inclined with respect to one another.

9. The single-lens reflex view finder according to claim 1, 2, 3, 4, 5, 6 or 7, wherein said focus confirming means is a light scattering surface.

10. The single-lens reflex view finder according to claim 1, 2, 3, 4, 5, 6 or 7, wherein said focus confirming means is a pattern of fine relieves.

11. The single-lens reflex view finder according to claim 1, 2, 3, 4, 5, 6 or 7, wherein said focus confirming means is a pair of wedge-shaped prisms.

12. The single-lens reflex view finder according to claim 2 or 3 comprising a lens component disposed at said secondary imaging location, wherein said focus confirming means is disposed on an observer side surface of said lens component.

13. The single-lens reflex view finder according to claim 3 satisfying the following condition (1):

$$0 < |\Delta Z| < 0.01 \times fe^2 \quad (1)$$

wherein the reference symbol $\Delta Z$ represents a deviation of a curved surface from a planar surface in contact therewith on the optical axis in a direction along the optical axis at a maximum image height or at a location of 0.7 times of a radius of an image circuit in a diagonal direction of an effective visual field and the reference symbol fe designates a total focal length of an optical system from the surface on which the focus confirming means is disposed to a surface of emergence of an eyepiece optical system.

14. The single-lens reflex view finder according to claim 10, wherein an image pickup device is disposed on an image pickup surface in an image pickup optical path which is split by said optical path splitting means and leads to the image pickup surface, and wherein said view finder satisfies the following condition (2):

$$0.4 < (n-1) \cdot P \cdot FNo \cdot \theta / fe < 3 \qquad (2)$$

wherein the reference symbol n represents a refractive index of a material of the surface on which the pattern of the fine relieves is disposed as the focus confirming means, the reference symbol P designates a pitch of picture elements on the image pickup device, the reference symbol FNo denotes an F number of the imaging optical system which is prolonged to its primary imaging surface, the reference symbol θ denotes an angle formed between each fine relief and the plane perpendicular to the optical axis and the reference symbol fe represents a total focal length (mm) of an optical system from the surface on which the focus confirming means is disposed to a surface of emergence of the eyepiece optical system.

15. The single-lens reflex view finder according to claim 10 satisfying the following condition (3):

$$1 \times 10^{-3} < RP/D < 2 \times 10^{-2} \qquad (3)$$

wherein the reference symbol RP represents a pitch of the fine relives, the reference symbol D designates a diameter of an effective visual field range for an image on the surface on which the pattern of the fine relives is disposed as the focus confirming means.

16. The single-lens reflex view finder according to claim 1, 2, 3, 4, 5, 6 or 7 satisfying the following condition (4):

$$0.08 < \phi/D < 0.4 \qquad (4)$$

wherein the reference symbol φ represents a diameter of the focus confirming means and the reference symbol D designates a diameter or a diagonal length of an effective visual field range for an image on the surface on which the focus confirming means is disposed.

17. The single-lens reflex view finder according to claim 11 comprising an image pickup device disposed at the location of the image formed by said imaging optical system in an optical path other than the view finder optical path out of the optical paths split by said optical path splitting means and satisfying the following condition (2-1):

$$0.4 < (N-1) \cdot P \cdot FNo \cdot \Theta / fe < 3 \qquad (2\text{-}1)$$

wherein the reference symbol N represents a refractive index of the wedge-shaped prism and the reference symbol Θ designates an angle formed between a reference of the wedge-shaped prism and a plane perpendicular to the optical axis.

18. The single-lens reflex view finder according to claim 1, 2, 3, 4, 5, 6 or 7, wherein a central portion of said refracting surface is configured as a planar surface and the focus confirming means is disposed on said planar surface.

19. The single-lens reflex view finder according to claim 1, 2, 3, 4, 5, 6 or 7, wherein said focus confirming unit comprises a plurality of planar surfaces, said planar surfaces being inclined with respect to one another.

* * * * *